Sept. 7, 1965          C. E. WILLIAMS          3,204,791
MOTOR POWERED VEHICLE FOR HANDICAPPED PERSONS
Filed Jan. 20, 1964          3 Sheets-Sheet 1
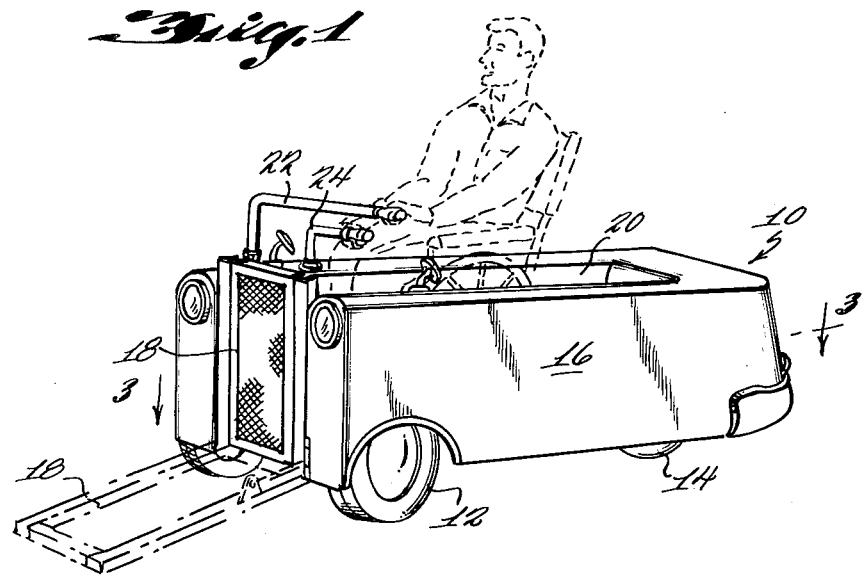
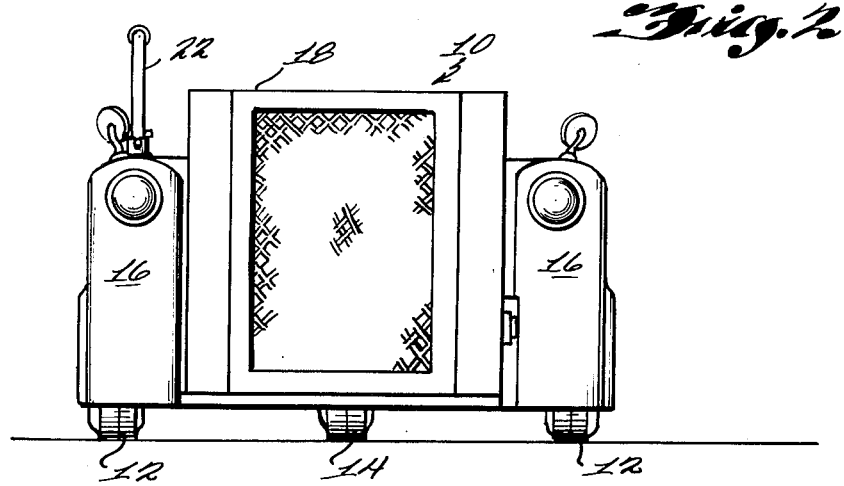
INVENTOR
CLAUDE E. WILLIAMS
BY
Cushman, Darby & Cushman
ATTORNEYS Sept. 7, 1965  C. E. WILLIAMS  3,204,791
MOTOR POWERED VEHICLE FOR HANDICAPPED PERSONS
Filed Jan. 20, 1964  3 Sheets-Sheet 2
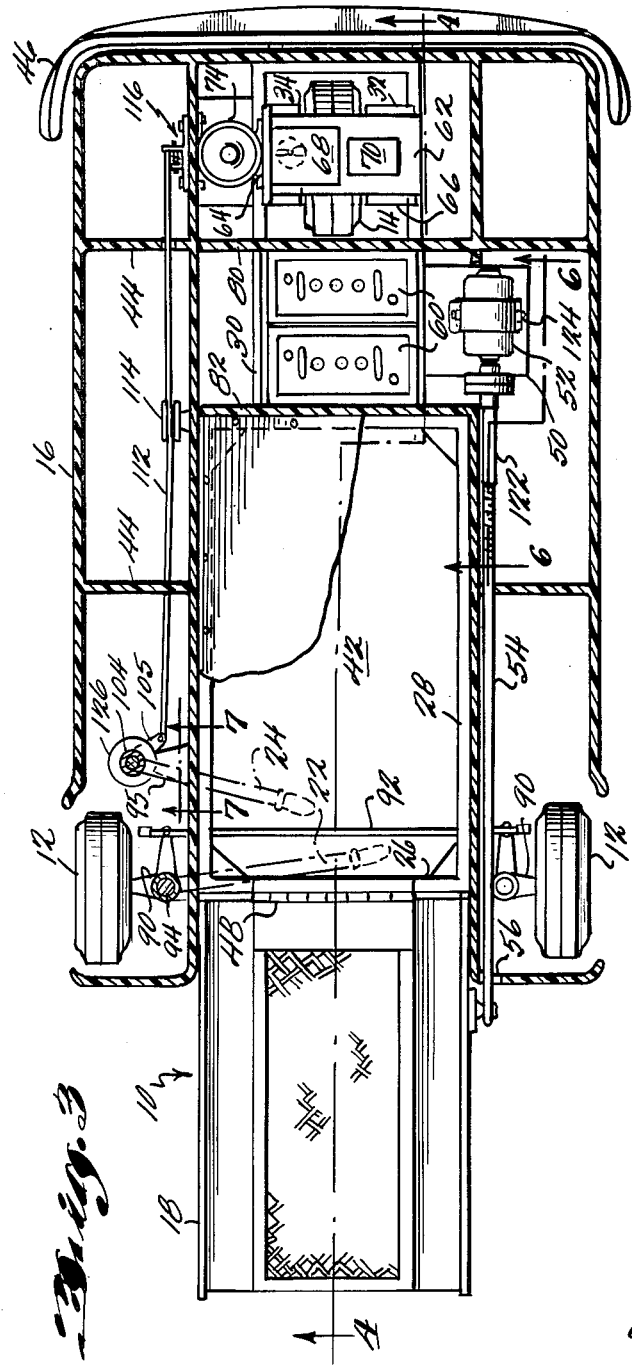
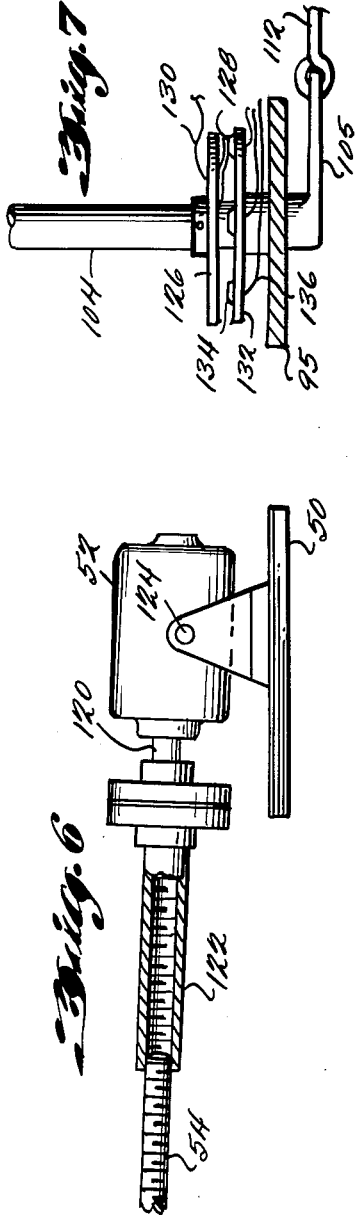
INVENTOR
CLAUDE E. WILLIAMS
BY Cushman, Darby & Cushman
ATTORNEYS

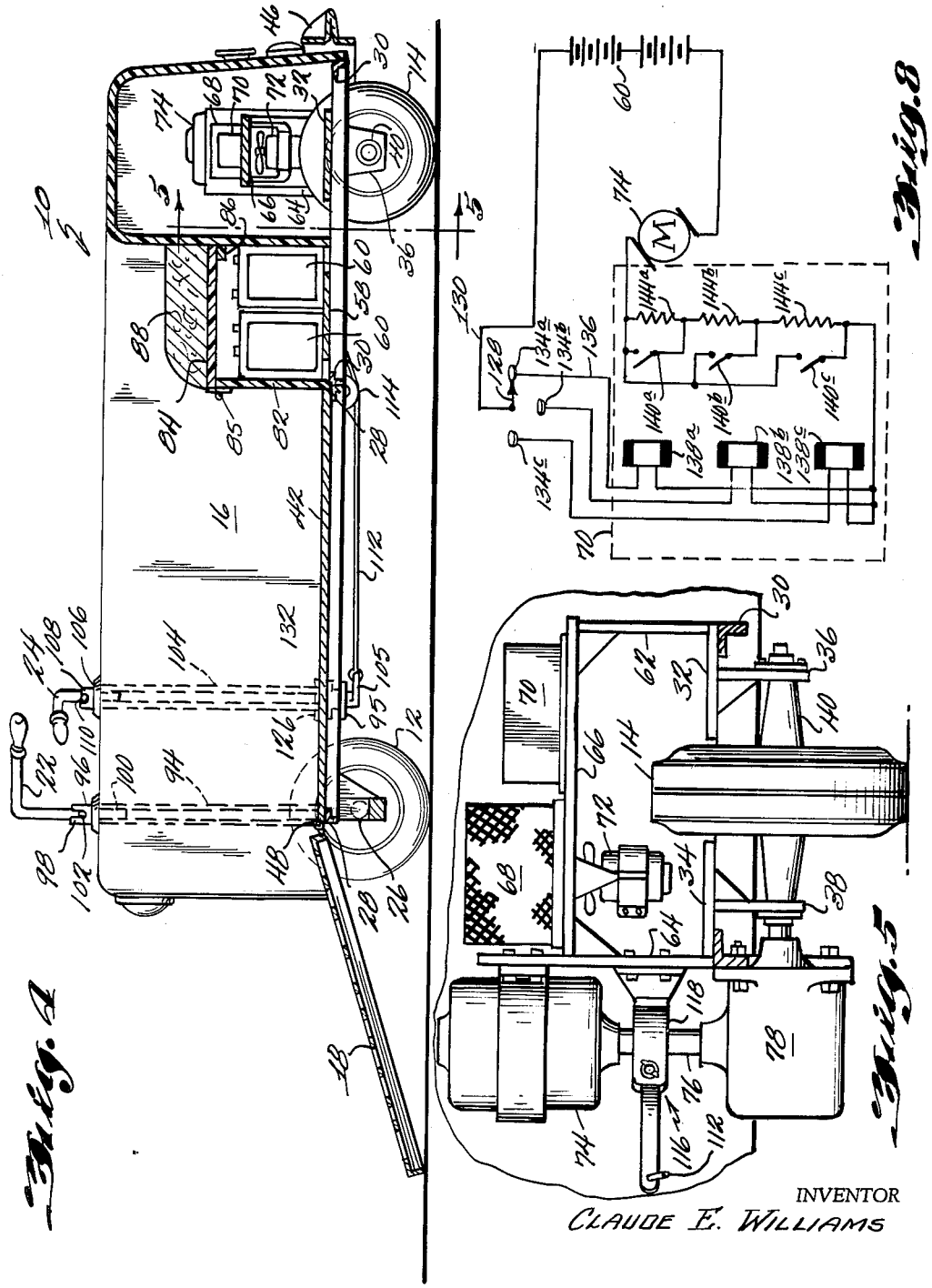

United States Patent Office 3,204,791
Patented Sept. 7, 1965

3,204,791
MOTOR POWERED VEHICLE FOR HANDI-
CAPPED PERSONS
Claude E. Williams, 2224 NW. 6th Terrace,
Fort Lauderdale, Fla.
Filed Jan. 20, 1964, Ser. No. 338,928
4 Claims. (Cl. 214—85)

This invention relates to a motor vehicle and more particularly, to a vehicle especially designed for use by handicapped persons.

In the past a number of arrangements have been provided for transporting handicapped persons. These include, for example, motorized wheel chairs, automobiles having special control systems and the like. However, the prior developments have suffered from several disadvantages. Among these is the fact that such devices as motorized wheel chairs are not suitable for roadway use and their speed and control characteristics are restricted due to the nature of the vehicle. Other vehicles, more automotive in nature, are difficult to enter and leave by the handicapped operator. A still further disadvantage of prior devices is the requirement that the handicapped person obtain assistance from another person in either positioning himself for operation or in operating the vehicle itself.

It is therefore the principal object of the present invention to provide an improved powered motor vehicle suitable for use, without assistance, by a handicapped person.

A further object of the invention is to provide a vehicle structure designed for easy access by the handicapped operator.

An additional object of the invention is to provide a motor vehicle having a variable speed arrangement.

Ancillary to the immediately preceding object, it is a further object of the invention to provide an improved braking system coordinated with the speed control arrangement.

A further object of the invention is to provide operator's control devices which may be selectively engaged to provide the vehicle control function and disengaged to facilitate entry to and exit from the vehicle.

Further objects and the entire scope of the invention will become more fully apparent when considered in light of the following detailed description of an illustrative embodiment of the invention and from the appended claims.

The illustrative embodiment may be best understood by reference to the accompanying drawings wherein:

FIGURE 1 is a view in perspective of one embodiment of the invention, dash lines being employed to illustrate the ramp in the loading position and the operator in operating position;

FIGURE 2 is a front elevational view of the invention with the loading ramp in the vehicle operating position;

FIGURE 3 is a horizontal sectional view of the invention taken substantially along line 3—3 of FIGURE 1 with the ramp in the loading position;

FIGURE 4 is a vertical sectional view of the invention taken substantially along line 4—4 of FIGURE 3;

FIGURE 5 is a fragmentary vertical sectional view taken along line 5—5 of FIGURE 4;

FIGURE 6 is a fragmentary vertical sectional view taken along line 6—6 of FIGURE 3;

FIGURE 7 is a fragmentary vertical sectional view taken along line 7—7 of FIGURE 3; and FIGURE 8 is a schematic electrical diagram of the variable speed control arrangement employed in the illustrative embodiment of the invention.

Briefly, the invention comprises a motor powered vehicle for use particularly by those who are disabled and are thereby confined to wheel chairs. The vehicle includes a motorized ramp which in the down position provides access to the interior of the vehicle so that the wheel chair may be rolled up the ramp into a position where the occupant may control the operation of the vehicle. Once the occupant is in the operating position, the ramp is elevated to a position where it becomes a portion of the vehicle structure. The invention also includes control levers within easy reach of the occupant of the vehicle, these control levers permitting the operator to steer the vehicle as well as to monitor its speed. Provisions are included for disengaging the levers from the control system and moving them out of the path of the occupant as he enters or leaves the vehicle.

Referring to FIGURES 1 and 2, the overall vehicle structure will be briefly described. The illustrative embodiment comprises a three wheeled structure, generally indicated at 10, which includes a pair of front wheels 12 and a power driven rear wheel 14. On suitable support means interconnected with the wheel assembly, the vehicle body 16 is mounted. In the embodiment illustrated, the body 16 includes a motorized ramp 18 which is hinged at its lower edge to the support means. With the ramp 18 in its elevated position, the ramp serves as a front portion of the vehicle body. However, on energization of the ramp motor, the ramp may be lowered to the position shown in dash lines wherein the upper edge contacts the ground. In this position the ramp serves to facilitate access to, and exit from, the occupant's compartment 20. Projecting through the upper surface of one of the side portions of the vehicle body are a pair of generally L-shaped control levers 22 and 24. Lever 22 is connected to a steering arrangement in a manner which will be described in detail hereinafter. The control lever 24 serves to control the acceleration characteristics of the vehicle as well as to serve as a brake actuator by an arrangement which will also be described later in the specification. Levers 22 and 24 are selectively positioned to provide these functions and may be easily displaced from their steering and the speed control positions as will be described. When an occupant, such as the one illustrated in dash lines in FIGURE 1, is within the portion 20 of the vehicle, control levers 22 and 24 extend transversely to the length of the vehicle in front of the occupant so that he may have easy access thereto.

Referring to FIGURES 3–5, the structural characteristics of the vehicle will be described. Interconnecting the front wheels 12 is a conventional axle and bell crank arrangement indicated generally at 26. A rectangular frame member 28 is suitably connected at its front edge to the axle, member 28 extending rearwardly towards the single rear wheel 14. Mounted to the rear edge of frame 28 is a smaller second rectangular frame 30 which extends rearwardly beyond the wheel 14. A pair of plates 32 and 34 are attached on opposite sides of frame 30, the plates extending towards one another and being spaced apart at their respective ends. Gussets 36 and 38 are connected to the underside of plates 32 and 34. By suitable bearing means, these gussets support the axle 40 of the rear wheel 14.

A platform 42 is mounted on top of the frame member 28. Suitably attached to the frame members 28 and 30 and to platform 42 is the vehicle body 16. This body is preferably of a material such as fiber glass and is designed with suitable reinforcing webs such as those indicated at 44 to add strength to the body structure. To the rear portion of the body 16 there is suitably connected a bumper 46 and to the front edge of the frame 30 the ramp 18 is hingedly joined. In the embodiment illustrated, this ramp comprises a generally rectangular shaped metal framework with a screen as the central portion of the ramp. The hinging of the ramp 18 to the frame 28 is indicated at 48.

A support plate 50 is mounted to the outside edge of a longitudinal portion of frame 30. A reversible ramp motor 52 is pivotally connected to the upper surface of this support plate. The ramp motor is operatively joined to one end of a connecting rod 54, the opposite end of which extends through the body 16 at opening 56 to be suitably attached to a side of the ramp 18 at a point spaced from the ringe 48 about which ramp 18 pivots. The precise operative structure of the ramp motor, the connecting rod, and the ramp will be described hereinafter with reference to FIGURE 6.

An additional support plate 58 extends across frame 30 intermediate frame 28 and the rear wheel 14. This plate serves to support a motor energizing voltage source such as wel cell batteries 60. Connected to plates 32 and 34 and extending vertically thereof are still additional plate members 62 and 64 respectively. Attached to the top surface of plate 62 and to the side of plate 64 is a supporting crosspiece 66. A conventional battery charger, generally indicated at 68, and a speed control relay housing 70 are mounted on the upper surface of crosspiece 66. A fan 72 is attached to the underside of member 66, this fan serving to cool the battery recharger 68. This arrangement can more clearly be seen by reference to FIGURE 5. A reversible drive motor 74 is mounted on the opposite side of plate 64. The drive shaft 76 of this motor is operatively connected to a right angle gear box 78 which is fixed on frame 30. The gear box 78 is operatively connected to the axle 40 of the rear wheel 14 so that the operation of the motor 74 drives wheel 14. The battery recharger 68, relay housing 70 and drive motor 74 are suitably housed within a portion 80 of the vehicle structure 16. Forwardly of housing 80 there is connected a vertically extending element 82. A horizontal member 84 is hingedly connected at 85 to the upper surface of element 82. This member has its opposite end resting on a projecting portion 86 extending forwardly of the housing 80 to provide a stop means. Element 82 and member 84 define a housing for the batteries 60. On top of element 84 a cushion 88 may be placed to provide a seat for an additional person. When access is desired to the batteries, member 84 may be pivoted about its hinge 85 to open the battery housing.

At the forward end of the vehicle, the wheels 12 are connected to the axle by means of bell crank arrangements 90 pivotally connected to the axle at opposite ends thereof. One arm of each of the bell cranks is connected to its associated wheel and the other arms are interconnected by a steering linkage rod 92 such that the pivoting of one of the bell cranks is translated to the other to maintain the wheels in a parallel relationship. A vertically extending hollow shaft 94, which projects through the upper surface of one side of the vehicle body 16, is operatively connected to the pivot point of one of the bell cranks 90. The projecting portion 96 of shaft 94 is provided with opposed notches 98 at the top thereof. Control lever 22 includes a lower projecting portion 100 which extends within the hollow shaft 94. Lever 22 also includes transverse projections 102 on opposite sides thereof which, when extended within the notches 98, permit the hollow shaft 94 to be rotated on movement of the control lever 22. However, when it is desired to disengage the control lever, it is simply elevated to remove the projections 102 from notches 98. A second hollow shaft 104 is provided in parallel spaced relationship to shaft 94, shaft 104 being connected at its lower end to frame 28 by a bracket 105. This shaft 104 is also provided with a portion 106 which projects above the upper surface of the vehicle body. Projection 106 includes notches 108 on opposite sides thereof which cooperate with transverse opposed projections 110 provided on control lever 24 so that this lever may also be selectively engaged with shaft 104. The lower end of shaft 104 is suitably joined to a braking cable 112 by means of a horizontal arm 105 connected at opposite ends to the shaft 104 and cable 112 respectively. The cable 112 extends rearwardly of the vehicle over a pulley 114 to engage a braking arrangement shown generally at 116. In FIGURE 5 this braking arrangement is illustrated in detail, the arrangement including a brake shoe 118 attached to plate 64 and position about drive shaft 76 to be selectively moved into contact with drive shaft 76 in a manner to be described hereinafter.

Now that the overall structure of the illustrative embodiment of the invention has been set forth, additional details thereof will be described. Referring to FIGURE 6, the arrangement for actuating the ramp 18 is shown in detail. The drive shaft 120 of ramp motor 52 is provided at its outer end thereof with an internally threaded shaft 122. The threaded end of connecting rod 54 is positioned within this shaft. As the reversible motor 52 is actuated, the threaded end of rod 54 moves along the interiorly threaded shaft 122 to effectively vary the length of the connecting rod 54 to thereby pivot the ramp 18 about hinge 48. To accommodate the resultant variance in the direction of the axis of the drive shaft of motor 52, the motor is pivotally mounted at 124 to the support plate 50.

For convenience of illustration, the precise electrical connections between the batteries and the various elements such as ramp motor 52, drive motor 74, battery recharger 68, and the relays within housing 70 have not been illustrated. However, it will be appreciated that since there is no particular necessity for driving ramp motor 52 at a variable speed, direct connections between the batteries and this motor 52 are utilized. Similarly, the interconnection between batteries 60 and their conventional recharging device 68 may also be by a direct connection. However, it is desirable to provide a variable speed arrangement for the drive motor 74. Accordingly, the details of this arrangement will be described, the mechanical aspects first being set forth.

In FIGURE 7 the hollow shaft 104 is illustrated as having attached thereto above the connection to the braking cable 112 an electrical contact arrangement. This arrangement comprises an insulated contact plate 126 mounted to the outer surface of shaft 104 for rotation therewith. Plate 126 has on its underside a contact 128 which is moved during rotation of the plate. Contact 128 has connected thereto an electrical lead 130. A second insulated contact plate 132, having a plurality of spaced contacts 134 mounted on the upper surface thereof to be individually engaged by the contact 28 as shaft 104 is rotated, is also mounted to the outer surface of shaft 104 in spaced relation to plate 126. Each of these contacts 134 is connected by separate electrical leads 136 to relays housed within relay housing 70.

Considering now FIGURE 8 of the drawings, a schematic diagram of the electrical connections is presented to indicate the manner of varying the speed of the drive motor 74 in accordance with the positioning of shaft 104. The movable contact 128 is shown engaging one of the stationary contacts 134. Each of the contacts (here illustrated as three in number) is connected to a respective relay. The stationary contacts have been designated 134a–c and their respective relays are numbered 138a–c. Associated with each of the relays is a normally open contact, designated as 140a–c respectively. The movable contact 128 is connected to one pole of batteries 60 and the other pole of the voltage source is connected through the windings of the drive motor 74. For purposes of illustration, it will be assumed that motor 74 is a simple series wound D.C. motor, the speed of which is controlled in proportion to its field resistance. For convenience, this field resistance is illustrated as comprising three separate resistors 144a–c. However, it will be apparent that this resistor may be a single resistance having potentiometer type pickoffs controlled by the condition of the contacts 140a–c with respect thereto. From the arrangement illustrated, it will be apparent that with movable contact 128 in the position shown, a circuit will be completed through relay 138a to energize this relay thereby closing its associated contact 140a to shunt a resistor 148a thereby increasing the field current of the motor 74. As the contact 128 is moved to engage contacts 134b and 134c in order, the relays 138b and 138c are energized to close their associated contacts to further decrease the field resistance of the motor thereby increasing its speed.

Now that the structure of the motor vehicle of the invention has been completely described, a typical cycle of operation thereof will be set forth. A person confined to a wheel chair who wishes to operate the device simply wheels himself to the outside of the vehicle by which he may unlock the power system by a suitable key arrangement (not shown). With the power system turned on, the operator then actuates switching means (not shown) to complete a circuit between batteries 60 and ramp motor 52 to move rod 54 outwardly from the internally threaded shaft 122 to lower the ramp 18 to the position shown in FIGURES 3 and 4 by which ready access to the interior portion, or compartment, 20 of the vehicle is available. During this operation, control levers 22 and 24 are disengaged from their respective actuating shafts 94 and 104 so that these levers do not impede the movement of the wheel chair into compartment 20 within vehicle body 16. Once within the vehicle, the operator then actuates the ramp motor switching means to drive the motor in the reverse direction to shorten the effective length of the connecting rod 54 thereby pivoting the ramp 18 about 48 from its extended position to its substantially vertical position wherein it comprises a portion of the vehicle structure. The control levers 22 and 24 may then be adjusted to position their respective projections 102 and 110 within the notches of the hollow shaft projections 96 and 106 thereby readying the vehicle for control by actuation of the control levers. The drive motor may then be started and its acceleration controlled by suitable movement of control lever 24 to effectively vary the field resistance as discussed with reference to FIGURE 8. As the vehicle moves, its direction is controlled by means of lever 22 which actuates the steering arrangement. When it is desired to stop the vehicle, the lever 24 is actuated to increase the field resistance of drive motor 74 thereby decreasing its speed to slow down the rotation of the driven rear wheel 14. Simultaneously with this increase in field resistance brought about by the movement of contact 128 in response to rotation of shaft 104, the tension on braking cable 112 is increased due to movement of arm 105 to bring the brake shoe 118 into engagement with the drive shaft 76 of motor 74 thereby halting the vehicle. The control levers may then be displaced from their operative positions and the ramp motor actuated in a direction to extend the effective length of the connecting rod 54 to lower the ramp 18 so that the operator may leave the vehicle. Once outside, the ramp 18 may again be raised and the power system locked.

The above described embodiment is illustrative of a preferred embodiment of the invention but is not intended to limit the possibilities of insuring a convenient motor powered vehicle which may be completely operated by a handicapped person without assistance. Other possibilities include the use of a self-starting gasoline engine with appropriate throttle control achieved by operation of control lever 24. Further variations include a conversion to a four-wheel vehicle, a positioning of the motorized ramp with respect to other portions of the vehicle body other than the front, hydraulic actuation of the ramp, rheostat control of the drive motor field, etc. The vehicle design disclosed herein is an example of an arrangement in which the inventive features of this disclosure may be utilized, and it will become apparent to one skilled in the art that certain modifications may be made within the spirit of the invention as defined by the appended claims.

What is claimed is:

1. In a powered vehicle for use particularly by handicapped persons, the improvement comprising: a vehicle frame, front and rear wheel assemblies connected to said frame, a vehicle body mounted on said frame, ramp means hinged at one end to said frame, means for operating said ramp between two positions whereby the ramp in one position permits the operator of said vehicle access to and exit from the interior of said vehicle body along said ramp and the ramp in the other position extends in a substantially vertical direction to be located co-extensively with said vehicle body to effectively comprise a portion thereof; independent drive means mounted on said frame within said vehicle body and connected to at least one of said wheel assemblies for powering said vehicle; a first control means operatively connected to said front wheel assembly for steering said vehicle; a second control means operatively connected to said drive means to selectively regulate the speed, and to brake, said drive means.

2. A powered vehicle as set forth in claim 1 further comprising additional reversible drive means mounted within said vehicle and connected to said ramp means to selectively position the ramp.

3. A powered vehicle as set forth in claim 1 wherein said first and second control means each include a control lever, said control levers normally being located in their operative positions in the path of access to or exit from the interior of said vehicle body, and further comprising means for disengaging said control levers by the operator to permit displacement thereof to facilitate access to and exit from said vehicle.

4. A powered vehicle as set forth in claim 1 wherein said drive means includes a drive shaft, braking means operatively related to said drive shaft and connected to said second control means in a manner such that the actuation of said second control means to brake said drive shaft simultaneously reductively regulates the speed of said drive means.

References Cited by the Examiner
UNITED STATES PATENTS

| | | | |
|---|---|---|---|
| 2,250,070 | 7/41 | Simmons | 214—85 X |
| 2,306,042 | 12/42 | Custer | 180—65 X |
| 2,721,758 | 10/55 | Allen | 214—85 X |
| 2,865,159 | 12/58 | Musgrave | 180—25 X |
| 2,892,506 | 6/59 | Slater | |
| 3,044,645 | 7/62 | Smith | 214—505 |

GERALD M. FORLENZA, *Primary Examiner.*